United States Patent [19]

Powell

[11] Patent Number: 5,655,840

[45] Date of Patent: Aug. 12, 1997

[54] TEMPERATURE DETECTING METHODS AND SYSTEMS

[75] Inventor: Brian D. Powell, Maidenhead, United Kingdom

[73] Assignee: Kidde Fire Protection Limited, Derby, United Kingdom

[21] Appl. No.: 347,721

[22] Filed: Dec. 1, 1994

[30] Foreign Application Priority Data

Dec. 3, 1993 [GB] United Kingdom ............... 9324805

[51] Int. Cl.$^6$ .................... G01K 7/16; G01K 7/36
[52] U.S. Cl. ........................... 374/183; 374/110
[58] Field of Search .................... 374/110, 114, 374/115, 116, 137, 183, 184, 185; 364/557, 723

[56] References Cited

U.S. PATENT DOCUMENTS

| | | | |
|---|---|---|---|
| 3,059,229 | 10/1962 | Tava et al. | |
| 3,064,245 | 11/1962 | Lindberg, Jr. | 374/116 |
| 3,665,766 | 5/1972 | Johnston | 374/115 |
| 4,361,799 | 11/1982 | Lutz | 374/114 |
| 4,372,693 | 2/1983 | Lutz | 374/184 |
| 4,763,113 | 8/1988 | Sassier | 340/596 |
| 5,226,729 | 7/1993 | Alford | 374/115 |
| 5,257,864 | 11/1993 | Nomura | 374/184 |

FOREIGN PATENT DOCUMENTS

| | | |
|---|---|---|
| 0028142 | 5/1981 | European Pat. Off. . |
| 0218519 | 4/1987 | European Pat. Off. . |
| 0253085 | 1/1988 | European Pat. Off. . |
| 0487730 | 6/1992 | European Pat. Off. . |

Primary Examiner—G. Bradley Bennett
Attorney, Agent, or Firm—Leydig, Voit & Mayer, Ltd.

[57] ABSTRACT

An elongate temperature sensor comprises two electrical conductors having temperature sensitive insulating material between them whose resistance and capacitance varies with temperature but according to respectively different known relationships. An alternating waveform is applied across the sensor through a known resistor. The amplitudes of the voltage waveforms developed across the known resistor and across the sensor are compared and the phase difference between them measured to determine the corresponding resistance and capacitance values of the sensor. The measured value of one parameter is then substituted into the respective known relationship to produce a corresponding temperature value for the sensor. This temperature value is then substituted into the relationship for the other parameter to calculate a notional value for that parameter. If that notional value differs from the measured value, this is used to produce an indication that the sensor is not being uniformly heated but has an overheated sectional part. By means of further processing, the length and position of the overheated section and its actual temperature can be determined.

27 Claims, 5 Drawing Sheets

TEMPERATURE DETECTING METHODS AND SYSTEMS

BACKGROUND OF THE INVENTION

The invention relates to temperature detecting systems and methods. One embodiment of the invention to be described in more detail below comprises an elongate temperature detector having distributed electrically insulating material whose parameters vary with temperature such that measurement of the parameters enables the detection of changes in temperature along the detector. In the embodiment to be described, localized increases in temperature can be distinguished from changes in average temperature of the detector, and the position of localized changes in temperature can be detected.

SUMMARY OF THE INVENTION

According to the invention, there is provided a temperature detecting system, comprising an elongate temperature sensor having two electrical parameters which vary according to respectively different predetermined relationships with temperature, measuring means for measuring the said parameters of the sensor, and comparing means for comparing the resultant measurements whereby to distinguish between a first condition in which the sensor is subjected to an average temperature change and a second condition in which a section of it is subjected to a localized temperature change.

According to the invention, there is further provided a temperature detecting method, using an elongate temperature sensor having two electrical parameters which vary according to respectively different predetermined relationships with temperature, comprising the steps of measuring the said parameters, and comparing the resultant measurements whereby to distinguish between a first condition in which the sensor is subjected to an average temperature change and a second condition in which a section of it is subjected to a localized temperature change.

DESCRIPTION OF DRAWINGS

Temperature detecting systems and methods according to the invention will now be described, by way of example only, with reference to the accompanying diagrammatic drawings in which.

DESCRIPTION OF PREFERRED EMBODIMENT

Figure 1:
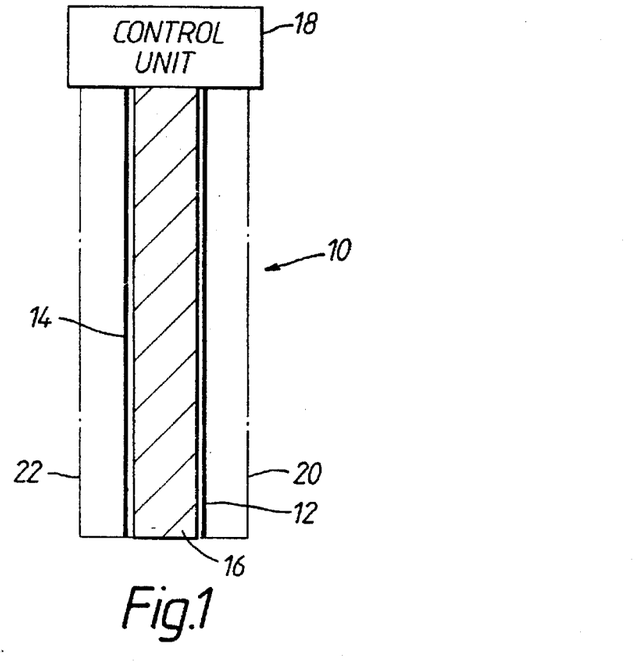
FIG. 1 is an overall and greatly simplified schematic circuit diagram of one of the systems showing its use of an elongate temperature sensor.

As shown in FIG. 1, an elongate temperature sensor 10 comprises two conductors 12 and 14 which are insulated from each other by temperature-dependent electrically insulating material shown diagrammatically at 16. A control unit 18 carries out certain electrical measurements on the sensor 10. The results of these measurements depend on the temperature of the material 16. In a manner to be described in more detail below, the measurements enable changes in overall temperature of the sensor to be sensed and also localized changes in temperature and the position of such localized changes.

Each conductor 12,14 may be connected back to the control unit 18 by a respective conducting link 20,22 shown dotted. The conducting links 20 and 22 are insulated with normal electrical insulation and are only used for continuity testing; that is, they enable the control unit 18 to detect breaks in the conductors 12 and 14.

In one form to be discussed in more detail, the temperature sensor 10 can be considered to comprise a distributed electrical resistance in parallel with a distributed electrical capacitance. The material 16 is such that its electrical resistance decreases with increasing temperature while its capacitance increases with increasing temperature. For example, it can take the form of an elongate temperature sensor sold under the trademark ALARMLINE. In one mode of operation of the system, now to be described with reference to FIG. 2, the control unit measures the resistance and capacitance between the conductors 12 and 14 of the sensor 10.

Figure 2:
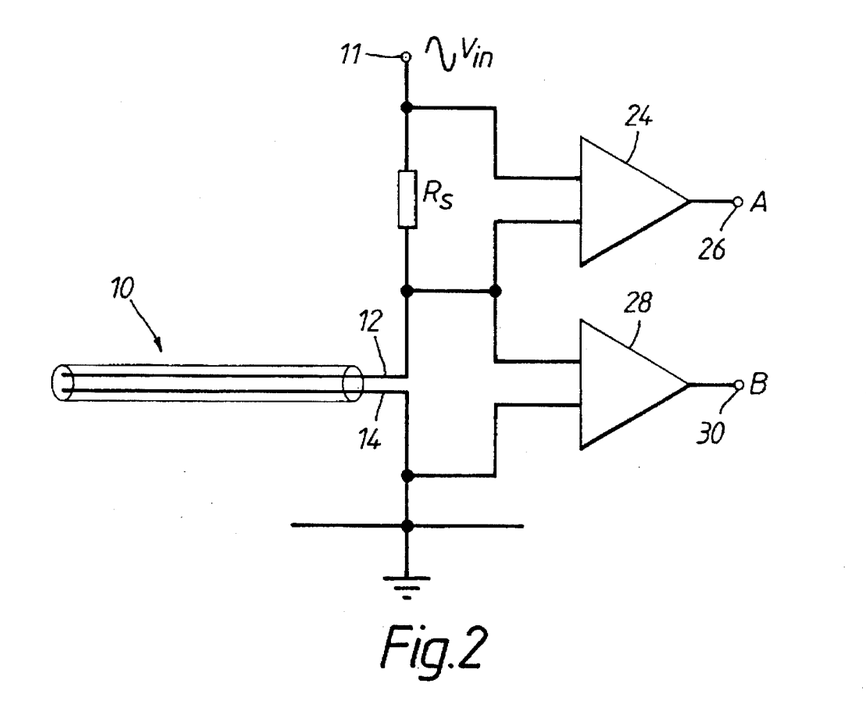
FIG. 2 is a schematic circuit diagram of the system of FIG. 1 in a mode for detecting localized temperature increases in the temperature sensor.

The temperature sensor 10 is illustrated only diagrammatically in FIG. 2, the temperature dependent insulating material 16 being omitted for clarity. As shown in FIG. 2, the control unit 18 (FIG. 1) applies the input waveform $V_{in}$ across the temperature detector 10 through an input terminal 11 and a fixed series resistance $R_s$. The input waveform $V_{in}$ is an AC waveform, and may, for example, be 2 V rms at 100 Hz. The value of $R_s$ may be 10 Kohm.

A first differential buffer amplifier 24 is connected to measure the voltage developed across the resistor $R_s$ and produces an output voltage waveform A at a terminal 26.

A second differential buffer amplifier 28 measures the voltage developed across the temperature sensor 10 and produces an output voltage waveform B at a terminal 30.

Figure 3:
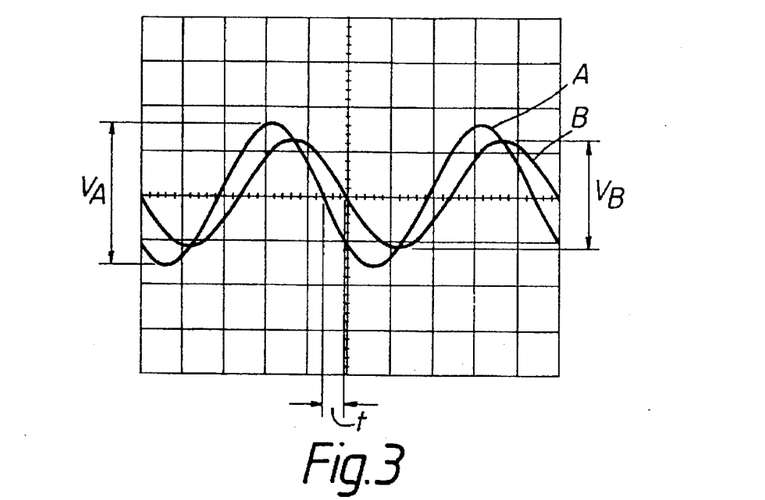
FIG. 3 shows waveforms occurring in the circuit of FIG. 2.

FIG. 3 shows the waveforms A and B which are typically produced. As indicated, the amplitude $V_A$ of the waveform A is greater than the amplitude $V_B$ of the waveform B, and there is a phase difference between the waveforms of A and B as indicated by the time difference, t, between zero crossings.

The control unit 18 (FIG. 1) measures $V_A$, $V_B$, and the time difference t. This enables the control unit to determine the impedance Z and the phase difference $\phi$, where $$Z = \frac{R_s V_B}{V_A} \quad (1)$$

$$\phi = \frac{2\pi t}{f} \quad (2)$$

f being the applied frequency of the waveform $V_{in}$.

On the assumption that the temperature sensor 10 can be considered to be a distributed electrical resistance $R_p$ in parallel with a distributed electrical capacitance $C_p$, it follows that $$R_p = \frac{Z}{\cos\phi} \quad (3)$$

$$C_p = \frac{\sin\phi}{2\pi fZ} \quad (4)$$

Figure 4A:
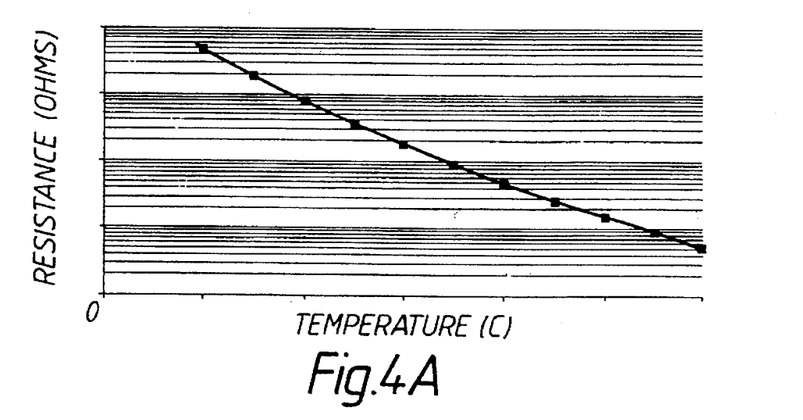
FIGS. 4A and 4B are graphs respectively showing the variation of resistance and capacitance against temperature in the elongate temperature sensor.
Figure 4B:
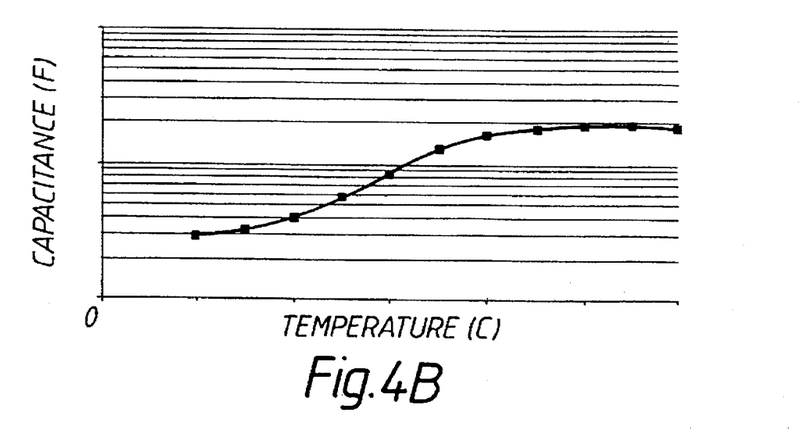

FIGS. 4A and 4B show how $R_p$ and $C_p$ respectively vary against temperature for a predetermined length of the temperature sensor 10 heated uniformly. FIGS. 4A and 4B show that the manner in which the resistance varies with temperature differs from that in which capacitance varies with temperature. This fact enables the system to distinguish a condition in which the sensor 10 is heated uniformly from a condition in which the sensor 10 is heated locally, and also enables the temperature to be measured.

This can be achieved in various different ways.

One way involves measuring $R_p$ and $C_p$ as a function of temperature for different lengths of the sensor 10. The experimental results so produced enable two equations to be derived:

$$R_p = f_1(T, L) \quad (5)$$

$$C_p = f_2(T, L) \quad (6)$$

where T is the mean temperature of a sensor of length L.

The control unit 18 therefore operates to measure $R_p$ and $C_p$ in the manner described above with reference to Equations (1) to (4). The total length $L_t$ of the sensor 10 is known. Therefore, using Equation (5), the control unit calculates a mean temperature value $T_m$ by substituting the measured value of $R_p$. The resultant value of $T_m$ will therefore be the mean temperature for the sensor 10 corresponding to the measured value of $R_p$, on the assumption that the sensor 10 is heated uniformly along its length.

The control unit 18 then substitutes the values of $L_t$ (the known total length of the sensor 10) and $T_m$ into Equation (6) to calculate a corresponding value of $C_{pe}$. This calculated value $C_{pe}$ is then compared with the actual measured value $C_p$. If the sensor 10 is in fact being heated uniformly to the temperature T, $C_{pe}$ will be substantially the same as the measured value $C_p$.

However, if there is a significant difference between $C_{pe}$ and $C_p$, it can be assumed that sensor 10 is not in fact being heated uniformly but is being heated non-uniformly.

The control unit 18 now operates to produce an estimate of the length of the heated section of the sensor and the temperature to which it is heated. This process is based on the simplifying assumption that the sensor has two zones, one of length $L_1$ at a temperature $T_1$ and the other of length $L_2$ at a temperature $T_2$ where $$L = L_1 + L_2 \quad (7)$$

and uses an iterative process as will now be described.

On the assumption that the sensor is made up of the two sections referred to above, one of length $L_1$ at a temperature $T_1$ and the other of length $L_2$ at a temperature of $T_2$, with each section comprising a distributed resistance in parallel with a distributed capacitance, it follows that $$R_p = \frac{1}{\frac{1}{f_1(T_1,L_1)} + \frac{1}{f_1(T_2,L_2)}} \quad (8)$$

$$C_p = f_2(T_1,L_1) + f_2(T_2,L_2) \quad (9)$$

Initially, the control unit 18 sets a value for $T_2$ which is slightly less (e.g. 5° less) than the previously calculated temperature value $T_m$, and sets a value for $L_1$ which is half the total length $L_t$ of the sensor 10. The resultant value of $L_2$ is obviously known from Equation 7. Therefore, using Equation 8 and the previously measured value for $R_p$, the control unit 18 can calculate a value for $T_1$ from this Equation. This value of $T_1$, together with the known values of $L_1$, $T_2$ and $L_2$ are then substituted into Equation 9 to produce a new value of $C_{pe}$. If this value of $C_{pe}$ is found to be substantially equal to the previously measured value for $C_p$, then clearly this indicates that the values of $T_1$, $T_2$, $L_1$ and $L_2$ are the actual values obtaining in the sensor. In the general case, of course, the value of $C_{pe}$ will not be equal to $C_p$. The above-mentioned process is therefore repeated, but this time the temperature $T_2$ is decreased again by the same decremental amount (e.g. 5°) and the value of $L_1$ is set to half its previous value (so that it is now equal to $L_t/4$). Using the resultant new value for $L_2$ (from Equation 7), and the new value for $L_1$, together with the measured value of $R_p$, a new value for $T_1$ is calculated from Equation 8. Using this new value for $T_1$, Equation 9 is then used to produce a new value for $C_{pe}$. Once more, this value of $C_{pe}$ is compared with the actual measured value for $C_p$. If the comparison should show substantial equality, then the values of $T_1$, $L_1$ and $L_2$ are those which can be assumed to exist in the actual sensor. If (as in the general case) this equality is not observed, the process is repeated again, with the value of $T_2$ being decreased by a further decremental amount (5°) and with the value of $L_1$ decreased or increased by diminishing amounts depending on whether $C_{pe}$ is greater than or less than $C_p$. The process continues until the value of $C_{pe}$ calculated in accordance with Equation 9 is found to be substantially equal to the measured value of $C_p$.

It will be appreciated that the temperature $T_2$ must not be decreased below the minimum expected ambient temperature. The latter value therefore represents the lowest value to which $T_2$ is decremented (but, if necessary, continued reductions in $L_1$ take place).

Figure 5A:
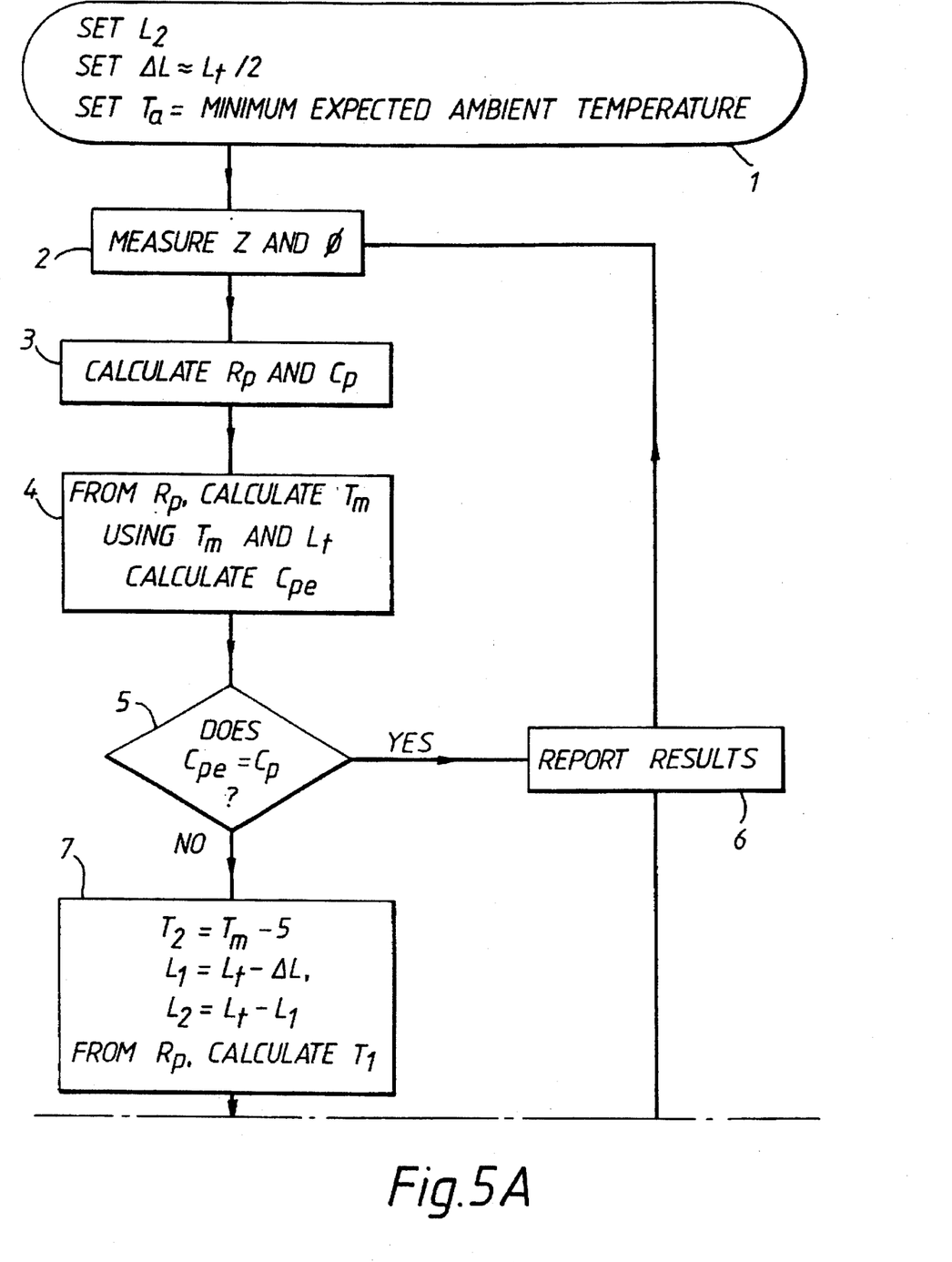
FIG. 5 is a flow chart for explaining the operation of the system in the mode illustrated in FIG. 2.
Figure 5B:
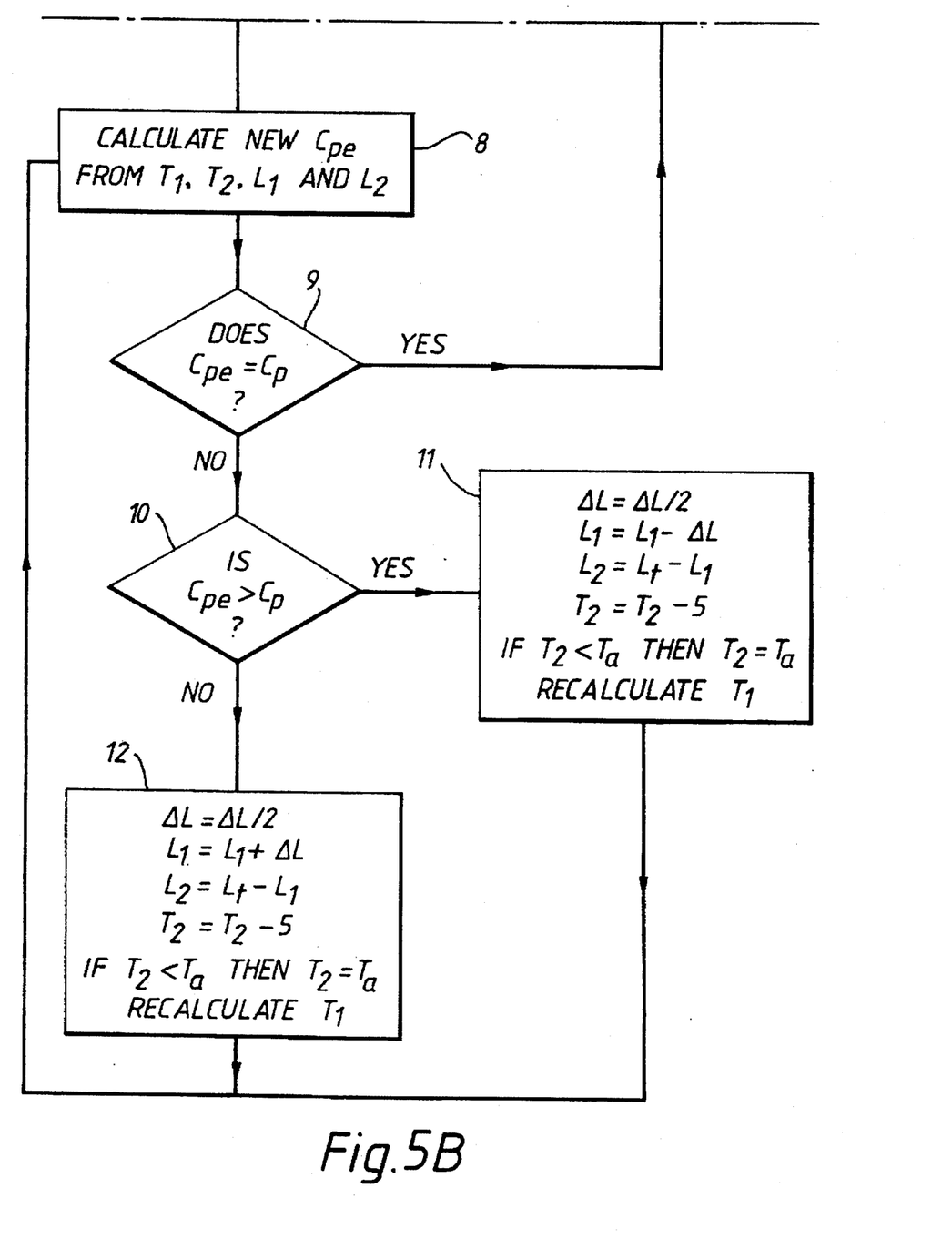

The flow chart of FIG. 5 illustrates the iterative process diagrammatically.

In FIG. 5, step 1 represents the setting of the initial condition. Step 2 represents the process carried out by the control unit 18 using the circuit of FIG. 2 as explained above. Using the measured values of Z and D, the control unit then calculates $R_p$ and $C_p$ as explained above in accordance with Equations (1) to (4) (step 3). Using Equations (5) and (6), the control unit then calculates a value for $C_{pe}$ (step 4). At step 5, the control unit 18 compares the calculated value for $C_{pe}$ with the measured value for $C_p$. If substantial equality is determined, this indicates that the sensor 10 is being heated substantially uniformly and the corresponding output is produced (step 6).

However, if equality is not determined, the control unit 18 begins the iterative process outlined above using Equations 8 and 9. As indicated in step 7, and as explained above, the temperature $T_2$ is set to be equal to the value of temperature $T_m$ less a decremental amount of 5° and the value of $L_1$ is set to be equal to half the total length of the sensor, $L_t$. From these values and the measured value of $R_p$, a value for $T_1$ is calculated. Using the resultant value of $T_1$ together with the values of $T_2$, $L_1$ and $L_2$, a new value for $C_{pe}$ is calculated (step 8) and then compared with the measured value of $C_p$ (step 9). If equality is detected, then an appropriate output is produced (step 6). If equality is not detected, the control unit 18 determines whether the calculated value of $C_{pe}$ is greater than the measured value of $C_p$ or not (step 10). If $C_{pe}$ is determined to be greater than $C_p$, the value of $L_1$ is halved (so as to be one quarter of $L_t$), see step 11.

The resultant value for $L_2$ is calculated and temperature $T_2$ is decreased again by the decremental amount (5°). Using Equation 8, a new value for $T_1$ is calculated and then substituted in Equation 9 to produce a new value for $C_{pe}$ as indicated in step 8.

Alternatively, if $C_{pe}$ is determined to be less than $C_p$ in step 10, the control unit increases the value for $L_1$ so as to become equal to three-quarters of $L_2$ resulting in a corresponding decrease in the value of $L_2$, and the value of the temperature $T_2$ is reduced by the decrement of 5°, all as shown in step 12. Again, a new value for $T_1$ is calculated and then used to produce a new value for $C_{pe}$ as indicated in step 8. This process repeats until step 9 determines substantial equality between $C_{pe}$ and $C_p$.

Steps 11 and 12 show that $T_2$ is not decreased below the minimum expected ambient temperature $T_a$.

The ability of the control unit 18 to determine that a section of the sensor 10 is heated to a higher temperature than the remainder, and to distinguish this condition from the condition in which the whole sensor is heated, improves the sensitivity of the sensor. If the control unit 18 were only able to sense the average temperature of the sensor 10 (by measuring the resistance, only, of the sensor, for example), it would only be able to detect elevated temperatures when the resistance value of the sensor decreased below a fixed threshold value corresponding to a maximum ambient temperature which would have to be pre-set into the control unit. However, this resistance threshold could also correspond to a relatively high temperature over a short section of the sensor, the rest of the sensor being at a low ambient temperature. The control unit would thus be unable to detect this condition.

Using the process described above with reference to FIGS. 1 to 5, however, the control unit is able to detect the presence of a hot section in the sensor even when the actual ambient temperature in which the sensor is situated, and which is thus the temperature of the remainder of the sensor, is well below the maximum expected ambient temperature.

Figure 6:
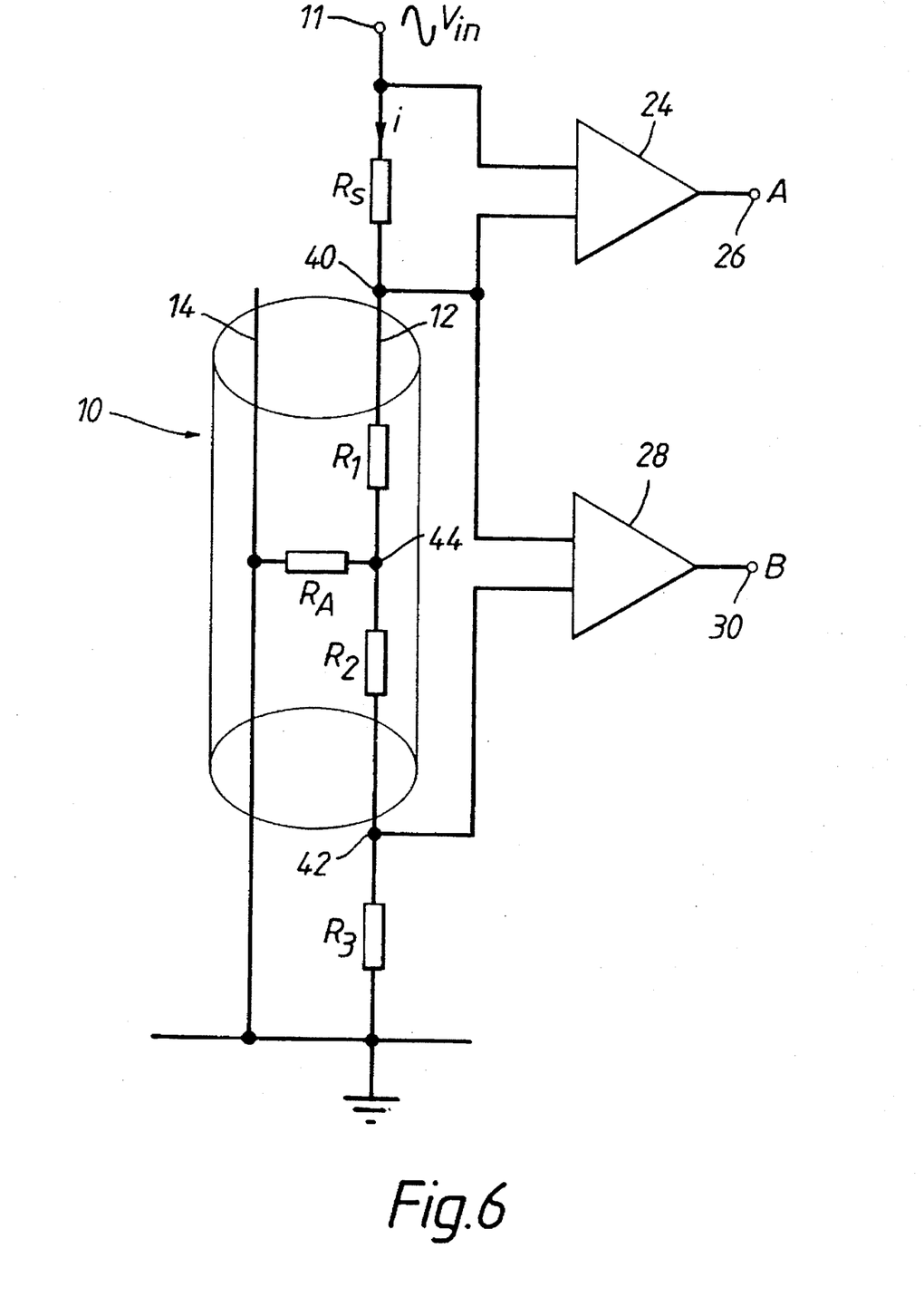
FIG. 6 is a schematic circuit diagram of the system in a mode for detecting the position of a localized temperature increase in the elongate temperature sensor.

FIG. 6 illustrates how the control unit may determine the position along the length of the sensor 10 of an overheated section. The control unit 18 may be arranged to enter this mode when it has determined, in the manner described with reference to FIGS. 1 to 5, that a locally overheated section of the sensor 10 exists.

Alternatively, it may simply enter the mode when the measured resistance value $R_p$ falls below a threshold value. In the latter case, it could of course be that the whole of the sensor is being heated to an elevated temperature; in that case, the control unit will not indicate the location of any local overheated section but will indicate that there is a general overheat.

FIG. 6 shows the conductors 12 and 14 of the sensor 10. The two ends of conductor 12 are indicated at 40 and 42 and it is assumed that there is a localized overheat section at 44 in the sensor 10, there being a consequential reduced resistance value $R_A$ between the conductors 12 and 14 at the position 44. It is further assumed that the length along the sensor between the end 40 and the overheat 44 is $l_1$ and the resistance of this length of the conductor 12 is $R_1$. Similarly, it is assumed that the length between the overheat 44 and the end 42 of the sensor is $l_2$ and the electrical resistance of the conductor 12 over this length is $R_2$.

As shown in FIG. 6, the circuit is again fed with an input waveform $V_{in}$ which may, for example, be 2 V rms at 100 Hz. Instead, however, a DC input may be used. $V_{in}$ is fed to the sensor 10 through input terminal 11 and a resistor $R_s$ which, as in FIG. 2, may be 10 kohm. In the case of FIG. 6, however, $V_{in}$ is fed across one conductor 12 only of the sensor through a resistor $R_3$ of value 1 Mohm.

As before, a differential buffer amplifier 24 measures the voltage across resistor $R_s$ and produces an output waveform A at terminal 26, the amplitude of this waveform being $V_A$.

The second differential buffer amplifier 28, however, is now connected to measure the voltage across the sensor conductor 12. Again, it produces an output waveform B at terminal 30, this waveform being $V_B$.

If $R_A$ is very much less than 1 Mohm, the current i from the input terminal 11 will flow through $R_s$, $R_1$ and $R_A$, with negligible current flow through $R_2$. Therefore, to a first approximation $$V_B = iR_1 \tag{10}$$

and $$i = \frac{V_A}{R_S} \tag{11}$$

Therefore, $$R_1 = \frac{V_B R_S}{V_A} \tag{12}$$

If the resistance of the conductor 12 of the sensor 10 is assumed to be r ohms per meter, then $$R_1 = l_1 r. \tag{13}$$

Therefore, from Equations (12) and (13), $$l_1 = \frac{V_B R_S}{V_A r} \tag{14}$$

The length $l_2$ (that is, the length from the end 42 of conductor 12 to the overheat 44) can be determined by reversing the connections of the sensor conductor 12, so as to connect its end 40 to the resistor $R_3$ and its end 42 to the resistor $R_s$, and then repeating the measurements.

If the overheat event does not comprise a point on the conductor but a section of significant length, measurements $l_1$ and $l_2$ will not coincide with a single point. The degree of mismatch between the positions indicated by $l_1$ and $l_2$ will be an estimate of the heated length.

Measurement of the resistance and capacitance values $R_p$ and $C_p$ as indicated with reference to FIG. 2, enables certain faults to be detected. Thus, a short circuit between the conductors 12 and 14 of the sensor 10 is indicated by a low value for $R_p$ and a zero value for $C_p$. The position of such a short circuit can be identified by the event location process described with reference to FIG. 6. An open circuit is detectable by loss of continuity in the conductor. The position of the open circuit can be estimated from the value of $C_p$.

The iterative process described with reference to FIG. 5 can be implemented by means of a microprocessor.

What is claimed is:

1. A temperature detecting system, comprising
   an elongate temperature sensor having two electrical parameters which vary according to respectively different predetermined relationships with temperature,
   measuring means for measuring said parameters of the sensor, and
   comparing means for comparing the resultant measurements to distinguish between a first condition in which the sensor is subjected to an average temperature change and a second condition in which a section of it is subjected to a localized temperature change.

2. A system according to claim 1, in which the comparing means comprises
   means operative in dependence on the measured value of one of said two parameters and on the respective relationship of that parameter to temperature to calculate the corresponding temperature value for the complete length of the sensor, means operative in dependence on that calculated value of temperature and on the predetermined relationship of the other parameter to temperature to calculate from the latter relationship the corresponding value for the other parameter, and means for comparing the calculated value of said other parameter with the actual measured value thereof, such that substantial equality indicates the first condition and substantial inequality indicates the second condition.

3. A system according to claim 2, in which each predetermined relationship relates the value of the respective parameter to temperature for a given length of the sensor, the said comparing means comprising means operative when the given length of the sensor is equal to its total length.

4. A system according to claim 1, in which the comparing means includes means operative to produce a first output indicative of the first condition and a second output indicative of the second condition, and including processing means operative in response to the second output to produce an indication of the length of said section subjected to the localized temperature change and the temperature of said section.

5. A system according to claim 4, in which one of said predetermined relationships relates the value of one of the parameters to a first value of temperature for a respective given longitudinal part of the sensor, and the other of said predetermined relationships relates the value of the other of said two parameters to a second, different, value of temperature for the remaining longitudinal part of the sensor, each part having a respective length such that the lengths of the two parts are together equal to the total length of the sensor, and the processing means includes means operative in dependence on production of the second output to determine respective values for the lengths of said two parts and corresponding temperature values which, for the measured values of the two parameters, satisfy both said predetermined relationships, whereby to indicate the length of said section subjected to the localized temperature change and the temperature of said section.

6. A system according to claim 5, in which the processing means comprises means for repeatedly altering the value of the length of one of said two parts and correspondingly altering the value of the length of the other of said two parts, and means for repeatedly altering one said temperature value, until there are produced respective values for the lengths of said two parts and corresponding temperature values which, for the measured values of the two parameters, satisfy both said predetermined relationships.

7. A system according to claim 5, in which the processing means is operative on an iterative basis.

8. A system according to claim 1, in which one said parameter is electrical resistance, and the other is electrical capacitance.

9. A system according to claim 8, in which the elongate temperature sensor comprises two adjacent electrical conductors running along the length of the sensor and in which the electrical resistance is the resistance between the two conductors and the electrical capacitance is the capacitance between the two conductors.

10. A system according to claim 8, in which the measuring means comprises means for applying an alternating electrical voltage waveform across the elongate sensor.

11. A system according to claim 10, in which the alternating voltage waveform is applied across the sensor through a known resistance, and in which the measuring means includes means for measuring the voltage developed across the known resistance and the voltage developed across the sensor, and means for comparing the two measured voltages and the phase difference between them whereby to calculate the values of the two said parameters.

12. A system according to claim 1, including means for determining the approximate position of the localized temperature change.

13. A system according to claim 9, in which the electrical resistance decreases with increasing temperature, and including further processing means for determining the approximate position of said section of the sensor subjected to localized temperature increase, the further processing means comprising first current feeding means for feeding current through one said conductor from one end thereof to said section and thence to the other conductor through the decreased electrical resistance resulting from the increased temperature, means for measuring the voltage developed across said one conductor by said current to determine the resistance of the part of said one conductor through which the current flows, and means for comparing the determined resistance with the resistance calculated in dependence on the known resistance value of the conductor per unit length, to determine the distance along said conductor between said one end and said section.

14. A system according to claim 13, including means for disconnecting said first current feeding means, second current feeding means for feeding current through said one conductor from the other end thereof, the current flowing to said section through its end closest said other end of the conductor and thence to the other conductor through the decreased resistance, means for measuring the voltage developed across said one conductor by said current whereby to determine the resistance of said one conductor through which the current flows, and means for comparing the determined resistance with the resistance calculated in dependence on the known resistance value of the conductor per unit length, to determine the distance along said conductor from said other end thereof to said section, such that a comparison of the two said distances enables an estimate of the length of said section.

15. A temperature detecting method, using an elongate temperature sensor having two electrical parameters which vary according to respectively different predetermined relationships with temperature, the method comprising the steps of measuring said parameters, and comparing the resultant measurements to distinguish between a first condition in which the sensor is subjected to an average temperature change and a second condition in which a section of it is subjected to a localized temperature change.

16. A method according to claim 15, in which the comparing step comprises the steps of calculating the temperature value for the complete length of the sensor in dependence on the measured value of one of said two parameters and on the respective relationship of that parameter to temperature, using that calculated value of temperature and the predetermined relationship of the other parameter to temperature to calculate from that relationship the corresponding value for the other parameter, and comparing the calculated value of said other parameter with the actual measured value thereof, whereby substantial equality indicates the first condition and substantial inequality indicates the second condition.

17. A method according to claim 16, in which each predetermined relationship relates the value of the respective parameter to temperature for a given length of the sensor, the said comparing step being operative when the given length of the sensor is equal to its total length.

18. A method according to claim 15, in which the comparing step includes the step of producing a first output indicative of the first condition and a second output indicative of the second condition, and including the step of responding to the second output to produce an indication of the length of said section subjected to the localized temperature change and the temperature of said section.

19. A method according to claim 18, in which one of said two predetermined relationships relates the value of the respective parameter to a first value of temperature for a respective longitudinal part of the sensor and the other of said predetermined relationships relates the value of the respective parameter to a second, different, value of temperature for the remaining part of the sensor such that the lengths of the two parts of the sensor are together equal to the total length of the sensor, and the step of responding to the second output comprises the further step of determining respective values, for the lengths of the two said parts and corresponding temperature values which, for the measured values of the two parameters, satisfy both said predetermined relationships, to indicate the length of said section subjected to the localized temperature change and the temperature of said section.

20. A method according to claim 19, in which the said further step comprises the steps of repeatedly altering one said given length value and correspondingly altering the other thereof, and repeatedly altering one said temperature value, until there are produced respective given length values and corresponding temperature values which, for the measured values of the two parameters, satisfy both said predetermined relationships.

21. A method according to claim 20, in which the further step is carried out iteratively.

22. A method according to claim 15, in which the said parameter is electrical resistance and the other is electrical capacitance.

23. A method according to claim 22, in which the measuring step comprises the step of applying an alternating electrical voltage waveform across the sensor.

24. A method according to claim 23, in which the alternating voltage waveform is applied across the sensor through a known resistance, and in which the measuring step includes the steps of measuring the voltage developed across the known resistance and the voltage developed across the sensor, and comparing the two measured voltages and the phase difference between them to calculate the values of the two said parameters.

25. A method according to claim 15, including the step of determining the approximate position of the localized temperature change.

26. A method according to claim 22, in which the elongate temperature sensor comprises two adjacent electrical conductors running along the length of the sensor and in which the electrical resistance and the electrical capacitance are respectively the electrical resistance and the electrical capacitance between the two conductors, the resistance decreasing with increasing temperature and including the step of determining the approximate position of the section of the sensor subjected to the localized temperature change, the latter step comprising the steps of feeding current through one said conductor from one end thereof to the section and thence to the other conductor through the decreased electrical resistance resulting from the increased temperature, measuring the voltage developed across the said one conductor by the said current whereby to determine the resistance of the part of the said one conductor through which the current flows, and comparing the determined resistance with the resistance calculated in dependence on the known resistance value of the conductor per unit length, to determine the distance along the said conductor between the said one end and the said section.

27. A method according to claim 26, including the steps of ceasing feeding of current through said one conductor from said one end thereof, feeding current through said one conductor from the other end thereof, the current flowing to said section through its end closest said other end of the conductor and thence to the other conductor through the decreased resistance, measuring the voltage developed across said one conductor by said current whereby to determine the resistance of said one conductor through which the current flows, and comparing the determined value of the resistance with the resistance calculated in dependence on the known resistance value of the conductor per unit length to determine the distance along the said conductor from said other end thereof to said section, such that a comparison of the two said distances enables an estimate of the length of said section.

* * * * *